US008823351B2

(12) United States Patent
Yamada (10) Patent No.: US 8,823,351 B2
(45) Date of Patent: Sep. 2, 2014

(54) OVERVOLTAGE THRESHOLD CONTROL SYSTEM OF DC TO DC CONVERTER

(75) Inventor: Kouhei Yamada, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 168 days.

(21) Appl. No.: 13/402,863

(22) Filed: Feb. 22, 2012

(65) Prior Publication Data

US 2012/0212205 A1 Aug. 23, 2012

(30) Foreign Application Priority Data

Feb. 23, 2011 (JP) ................................. 2011-037575

(51) Int. Cl.
*G05F 1/571* (2006.01)
*H02H 9/04* (2006.01)

(52) U.S. Cl.
USPC ........................................ 323/284; 361/91.2

(58) Field of Classification Search
CPC ........... H02M 1/32; G05F 1/468; H02H 9/00; H02H 9/048; H02H 9/043
USPC ............. 361/86, 90, 91.1, 91.2; 323/283, 284
See application file for complete search history.

(56) References Cited

U.S. PATENT DOCUMENTS

| | | | | |
|---|---|---|---|---|
| 5,735,254 A | * | 4/1998 | Palara et al. | 123/644 |
| 7,099,164 B2 | * | 8/2006 | Zhu et al. | 363/21.12 |
| 7,242,170 B1 | * | 7/2007 | Natsume | 323/285 |
| 7,568,117 B1 | * | 7/2009 | Fernald | 363/21.01 |
| 2008/0136389 A1 | | 6/2008 | Uchimoto et al. | |
| 2012/0170165 A1 | * | 7/2012 | Jung et al. | 361/86 |

FOREIGN PATENT DOCUMENTS

| | | |
|---|---|---|
| JP | 2000-295846 A | 10/2000 |
| JP | 2001-016849 A | 1/2001 |
| JP | 2008-148502 A | 6/2008 |

OTHER PUBLICATIONS

EN5365QI (Datasheet, "6A Voltage Mode Synchronous Buck PWM DC-DC Converter with Integrated Inductor 3-Pin VID Output Voltage Select," Enpiron, Inc., Sep. 18, 2009).*

* cited by examiner

*Primary Examiner* — Adolf Berhane
*Assistant Examiner* — Jye-June Lee
(74) *Attorney, Agent, or Firm* — Rabin & Berdo, P.C.

(57) ABSTRACT

A control system of a DC to DC converter skips switching pulses according to the output of an overvoltage protection circuit. The overvoltage protection circuit includes an overvoltage threshold voltage control section that lowers an overvoltage threshold voltage when the pulse width has a minimum valve. The control system both improves the output voltage accuracy of the DC to DC converter under a light load and promotes a quick return to normal operation after an overvoltage protection operation under a heavy load.

6 Claims, 6 Drawing Sheets

OVERVOLTAGE THRESHOLD CONTROL SYSTEM OF DC TO DC CONVERTER

CROSS-REFERENCE TO RELATED APPLICATION

This application claims the benefit of priority of Japanese patent application number 2011-037575, filed on Feb. 23, 2011, the disclosure of which is incorporated herein by reference.

BACKGROUND OF THE INVENTION

1. Field of the Invention

The present invention relates to a control system of a DC to DC converter that drives a switching device in the DC to DC converter.

2. Background Art

Figure 6:
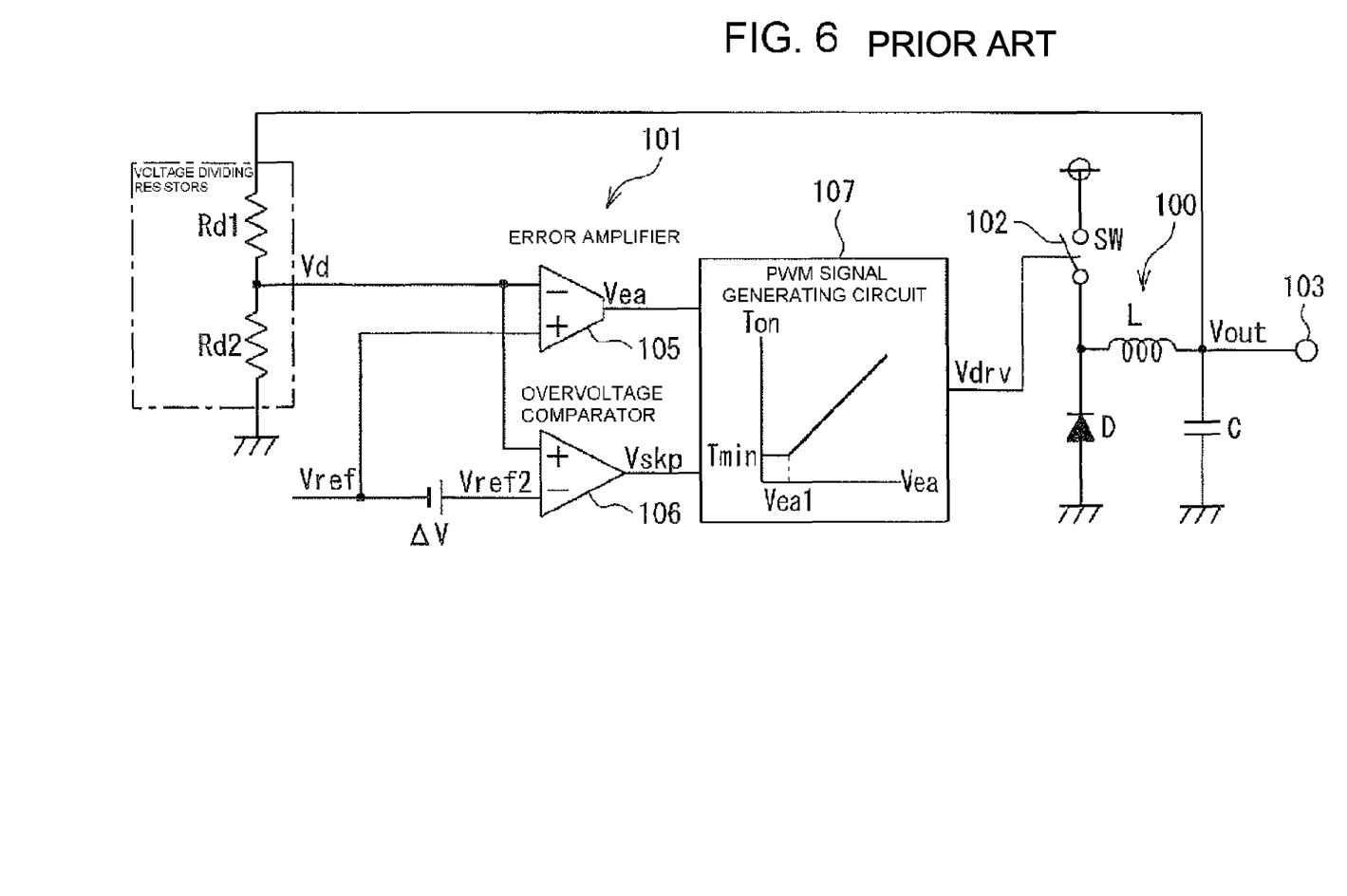
FIG. 6 is a block diagram showing an example of a related control system of a DC to DC converter.

For a control system of a DC to DC converter of such a kind, a system having the configuration shown in FIG. 6 is known. FIG. 6 is a block diagram showing an example of a related control system of a DC to DC converter. The control system of a DC to DC converter is provided with a DC to DC converter section 100 and a control section 101 controlling the DC to DC converter section 100.

The DC to DC converter section 100 has a configuration in which a choke coil L is connected to a positive power supply through a switching device 102 with one end thereof and to an output terminal 103 with the other end and, along with this, a rectifying diode D, having the anode thereof on the ground side, is connected between a connection point of the choke coil L with the switching device 102 and the ground. In the configuration, a smoothing capacitor C is further connected between a connection point, at which the choke coil L is connected to the output terminal 103, and the ground.

While, the control section 101 is provided with an error amplifier 105, an overvoltage comparator 106 and a pulse-width modulation (PWM) signal generating circuit 107.

The error amplifier 105 amplifies a difference voltage between a feedback voltage Vd supplied to an inverting input side and a reference voltage Vref supplied to a non-inverting input side to output an error voltage Vea. The feedback voltage Vd is a voltage to which an output signal Vout outputted to the output terminal 103 is divided by voltage dividing resistors Rd1 and Rd2 to be fed back.

The overvoltage comparator 106 compares a second overvoltage threshold voltage Vref2 supplied to an inverting input side and the feedback voltage Vd supplied to a non-inverting input side to output a skip signal Vskp. The second overvoltage threshold voltage Vref2 is an overvoltage threshold voltage higher than the reference voltage Vref for which threshold voltage an additional voltage ΔV is added to the reference voltage Vref.

The PWM signal generating circuit 107 has the error voltage Vea from the error amplifier 105 and the skip signal Vskp from the overvoltage comparator 106 inputted to produce a pulse driving signal Vdrv as a pulse-width modulation signal. The pulse driving signal Vdrv outputted from the PWM signal generating circuit 107 is supplied to the switching device 102 for the on-off driving thereof.

Here, an on-time Ton of the pulse driving signal Vdrv to the error voltage Vea of the error amplifier 105 becomes as shown in a characteristic diagram in a circuit block of the pulse-width modulation signal generating circuit 107. The characteristic curve shown in the characteristic curve diagram is set so that the on-time Ton as a pulse width keeps the minimum on-time Tmin while the error voltage Vea reaches a set voltage Vea1 from zero and, after the error voltage Vea exceeds the set voltage Vea1, increases in direct proportion to an increase in the error voltage Vea. Since the pulse width of the pulse driving signal Vdrv as a pulse-width modulation signal is determined on the basis of the on-time Ton, when the on-time Ton as a pulse width is set at the minimum on-time Tmin, the pulse width of the pulse driving signal Vdrv as a pulse-width modulation signal becomes minimum and after the on-time Ton as a pulse width exceeds the minimum on-time Tmin, the pulse width also increases.

Moreover, in the pulse-width modulation signal generating circuit 107, the input of a high-level skip signal Vskp from the overvoltage comparator 106 when the feedback voltage Vd becomes equal to or more than the second overvoltage threshold voltage Vref2 (=Vref+ΔV) causes the skip signal Vskp to skip the pulse of the pulse driving signal Vdrv while the skip signal Vskp is at a high level.

Here, two kinds of use can be considered for the overvoltage comparator 106, namely reduction of a switching loss at the time under a light load and prevention of an overvoltage that can not be permissible at the time of transient response.

The reduction of a switching loss at the time under a light load is to reduce a switching loss by skipping the pulse of the pulse driving signal Vdrv and, along with this, to prevent the output voltage Vout from increasing when a load connected to the output terminal 103 is brought to be lightened. When the pulse width of the pulse driving signal Vdrv reaches the minimum on-time Tmin, even though the error voltage Vea from the error amplifier 105 is reduced, the pulse width is kept at the minimum on-time Tmin and is not narrowed. This, when the state is kept as it is, results in a continuous increase in the output voltage Vout and, along with this, an increase also in the feedback voltage Vd. For preventing this, the overvoltage comparator 106 is used by which a feedback voltage Vd becoming equal to or more than the second overvoltage threshold voltage Vref2 brings a skip signal Vskp into a high level to skip pulses in a pulse driving signal Vdrv outputted from the PWM signal generating circuit 107. This reduces the number of times of switching carried out by the switching device 102 at the time under a light load to enable reduction in losses due to switching, which can prevent the output voltage Vout from increasing. By giving attention to the function that can prevent the output voltage Vout from increasing, the minimum pulse width is sometimes set intentionally. In this case, the control of the output voltage is carried out by the overvoltage comparator 106 regardless of the error amplifier 105. With the level of the skip signal Vskp from the overvoltage comparator 106 brought from a high level to a low level, switching with the minimum pulse-width occurs to cause a slight increase in the feedback voltage Vd. With the feedback voltage Vd becoming equal to or more than the second overvoltage threshold voltage Vref2, the level of the skip signal Vskp outputted from the overvoltage comparator 106 is reversed to a high level to stop the switching of the switching device 102. Moreover, by repeating an operation, in which when the feedback voltage Vd is reduced by the load current down to a voltage smaller than the second overvoltage threshold voltage Vref2, the level of the skip signal Vskp outputted again from the overvoltage comparator 106 is brought to a low level, the value of the output voltage Vout is maintained at a constant value. Therefore, in the control system, for bringing the output voltage Vout close to the target voltage, it is preferable to make the additional voltage ΔV small to bring the second overvoltage threshold voltage Vref2 close to the reference voltage Vref.

While, there is also a proposal as the following for reducing a switching loss (see JP-A-2001-16849, for example).

According to the proposal, in a switching converter in which the minimum value of the on-period of a switching pulse as the pulse driving signal Vdrv is provided for reducing power consumption in a power supply section during standby (at the time under a light load) of a device connected to the switching converter, the reduction in an output voltage of an error amplifier to a specified voltage or less makes the switching pulse skipped to reduce a switching loss.

Even in the case in which the error voltage Vea of the error amplifier 105 is high to some extent to cause no pulse width as the on-time Ton to reach the minimum on-time Tmin yet, a load current sometimes reduces abruptly like in the case when the mode of the load is switched to a standby mode in a large scale integrated circuit such as a microprocessor, for example. In this case, the reduction in the error voltage Vea from the error amplifier 105 is too insufficient to follow the abrupt reduction in the load current to cause an increase in the output voltage Vout. By the increase in the output voltage Vout, the feedback voltage Vd exceeds the second overvoltage threshold voltage Vref2, by which the level of the skip signal Vskp outputted from the overvoltage comparator 106 is inverted to be at the high level to stop the switching of the switching device 102. As a result, an increase in the output voltage Vout is inhibited so that no feedback voltage Vd exceeds the second overvoltage threshold voltage Vref2. Moreover, the error voltage Vea of the error amplifier 105 reduces with a speed corresponding to the difference between the feedback voltage Vd and the reference voltage Vref. When the error voltage Vea of the error amplifier 105 reduces to a voltage close to the voltage of a specified value corresponding to a load current, the control operation returns to a normal output voltage control by the error amplifier 105. In this case, a small value of the additional voltage ΔV causes the feedback voltage Vd to be limited to a low value. This causes the reduction in the error voltage Vea to become slow to result in a lengthened time taken until the operation returns to a control operation carried out by the error amplifier 105. Therefore, the additional voltage ΔV is desirably set high within a range being capable of suppressing the increase in the output voltage Vout.

Namely, a control system of a DC to DC converter system according to the related art has the following problems. An additional voltage ΔV set small enables an error between the output voltage Vout and a target voltage to be made small under such a light load condition that the output voltage Vout is controlled by the overvoltage comparator 106. However, under such a heavy load condition that the output voltage Vout is controlled by the error amplifier 105 in a steady state, after the overvoltage comparator 106 is operated for transient protection against an excessive overvoltage, the operation returns to the control carried out by the error amplifier 105. This causes the return to the control carried out by the error amplifier 105 to be delayed. While, when a large additional voltage ΔV is set, the foregoing process is reversed to present problems of making it impossible to actualize both of the improvement in output voltage accuracy under a light load condition and the quick return to a normal control after an overvoltage protection operation under a heavy load condition.

Moreover, in the example of a related control system of a DC to DC converter described in JP-A-2001-16849 cited in the foregoing, a switching pulse is made skipped on the basis of the output of the error amplifier, so that in the case in which the output voltage Vout is abruptly increases by a sudden change in a load, the converter can not respond to the increase. Therefore, it becomes indispensable to additionally provide an overvoltage protection circuit. This causes the function of skipping (stopping) the switching pulse to be doubly provided in both the error amplifier and the overvoltage protection circuit to create a problem of increasing a circuit scale and, along with this, a problem of how to adjust the doubly provided functions when there is a difference between the outputs of the two circuits.

Accordingly, the invention was made by paying attention to the unsolved problems in the examples of the related control system of a DC to DC converter with an object of providing a control system of a DC to DC converter in which a switching pulse is skipped according to the output of an overvoltage protection circuit rather than the output of an error amplifier and, along with this, both of an improvement in output voltage accuracy at the time under a light load and a quick return to a normal operation after an overvoltage protection operation at the time under a heavy load can be actualized.

SUMMARY OF THE INVENTION

For achieving the above object, a control system of a DC to DC converter according to a first aspect of the invention is characterized by including: an error amplifier which amplifies a difference voltage between a feedback voltage of an output signal of the DC to DC converter and a reference voltage and outputs the amplified difference voltage; an overvoltage comparator which outputs a skip signal that skips a signal outputted to the DC to DC converter when the feedback voltage exceeds an overvoltage threshold voltage set higher than the reference voltage; a pulse-width modulation signal generating circuit which is connected to the error amplifier and the overvoltage comparator, generates a pulse driving signal as a pulse signal that drives a switching device operating the DC to DC converter with the pulse width of the pulse driving signal made varied on the basis of the output voltage of the error amplifier to have the width equal to the set minimum value or more, and along with this, skips the pulse driving signal by the skip signal from the overvoltage comparator; a pulse-width detection section which detects whether the pulse width of the pulse driving signal outputted from the pulse-width modulation signal generating circuit has the minimum value or not and outputs a selection signal of a pulse width; and an overvoltage threshold voltage control section which lowers the overvoltage threshold voltage to be less than the overvoltage threshold voltage for the pulse width of the pulse driving signal being a width other than the minimum value when the selection signal indicating that the pulse width of the pulse driving signal outputted from the pulse-width modulation signal generating circuit has the minimum value.

A control system of a DC to DC converter according to a second aspect of the invention is characterized in that the overvoltage threshold voltage control section includes: a first overvoltage threshold voltage output section which outputs a first overvoltage threshold voltage selected for the pulse width of the pulse driving signal being a width other than the minimum value; a second overvoltage threshold voltage output section which outputs a second overvoltage threshold voltage lower than the first overvoltage threshold voltage in the first overvoltage threshold voltage output section; and a threshold voltage selecting section which selects one of the output of the first overvoltage threshold voltage output section and the output of the second overvoltage threshold voltage output section on the basis of the selection signal outputted from the pulse-width detection section.

A control system of a DC to DC converter according to a third aspect of the invention is characterized in that the pulse-width modulation signal generating circuit includes: a pulse-width modulation signal shaping circuit which converts the output voltage of the error amplifier to a pulse-width modulation base signal; a logical product circuit which outputs a logical product signal of the output signal of the pulse-width modulation signal shaping circuit and the skip signal outputted from the overvoltage comparator; and a driving signal output section which outputs the pulse driving signal on the basis of the logical product signal of the logical product circuit, the pulse driving signal having the pulse width thereof becoming more than the minimum value.

A control system of a DC to DC converter according to a fourth aspect of the invention is characterized in that the pulse-width detection section detects whether or not the output voltage of the error amplifier is equal to or less than the voltage that makes the pulse width of the pulse driving signal the minimum, and outputs the selection signal at a level corresponding to the result of the detection.

Moreover, a control system of a DC to DC converter according to a fifth aspect of the invention is characterized in that the driving signal outputting section includes: a D-type flip-flop circuit which has the output signal of the logical product circuit inputted to a clock input terminal thereof, a positive DC power supply voltage inputted to a data terminal thereof, the pulse driving signal outputted from an output terminal thereof, an inverted signal of the pulse driving signal outputted from an inverted output terminal thereof, and a clear signal clearing the D-type flip-flop circuit inputted to a clear terminal thereof; a fall delay circuit which is connected to the inverted output terminal of the D-type flip-flop circuit to have the inverted signal supplied thereto, and outputs a delayed signal with the falling of the inverted signal being made delayed; and a NOR gate which has the input side thereof connected to the output side of the logical product circuit and the output side of the fall delay circuit, has the output signal of the logical product circuit and the delayed signal of the fall delay circuit inputted, and has the output thereof inputted to the clear terminal of the D-type flip-flop circuit.

Furthermore, a control system of a DC to DC converter according to a sixth aspect of the invention is characterized in that the pulse-width detection section is provided with a D-type flip-flop circuit having the delayed signal that is outputted from the fall delay circuit inputted to an input terminal, the inverted signal of the output signal of the logical product circuit inputted to a clock terminal, and the selection signal outputted from an inverted output terminal.

According to the invention, a control system of a DC to DC converter can be provided in which when the pulse width of the pulse driving signal outputted from the pulse-width modulation (PWM) signal generating circuit has the minimum value, the overvoltage threshold voltage to be compared with the output signal of the error amplifier by the overvoltage comparator is lowered so as to be less than the overvoltage threshold voltage for the pulse width of the pulse driving signal being a width other than the minimum value. Thus, at the time under a light load, the output voltage control is carried out with a small error to stabilize the output voltage to improve control accuracies. While, at the time under a heavy load, an overvoltage protection operation is carried out and, after the overvoltage protection operation, the operation can be made to quickly return to the normal control operation carried out by the error amplifier.

DESCRIPTION OF THE PREFERRED EMBODIMENT

In the following, embodiments of the invention will be explained on the basis of the attached drawings.

Figure 1:
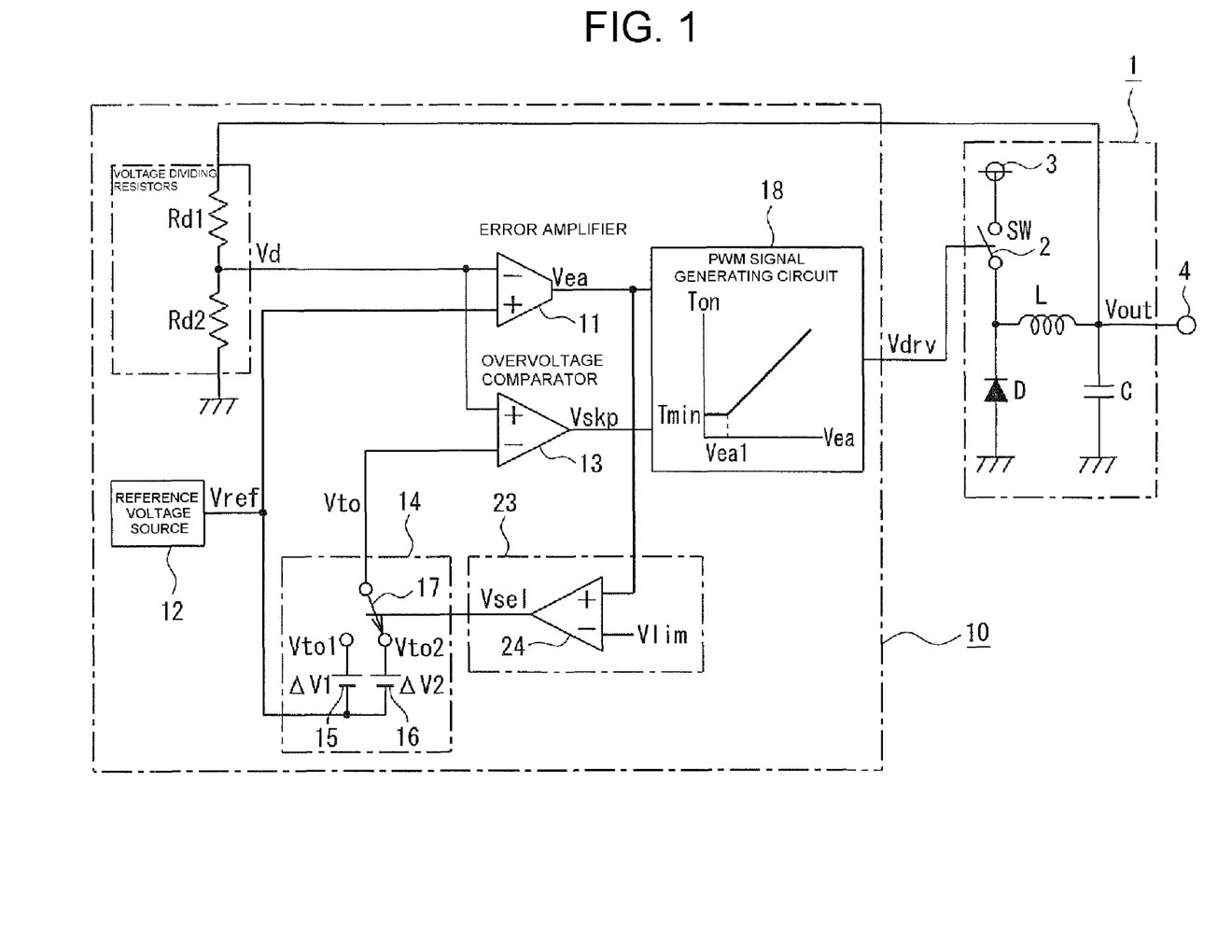
FIG. 1 is a block diagram showing a control system of a DC to DC converter according to a first embodiment of the invention.

FIG. 1 is a block diagram showing a control system of a DC to DC converter according to a first embodiment of the invention.

In the drawing, reference numeral 1 denotes a DC to DC converter section of a chopper system. The DC to DC converter section 1 has a choke coil L. The choke coil L is connected to a positive DC power supply 3 with one end thereof through a switching device 2 formed with a semiconductor device such as a MOS field effect transistor, for example, and is connected to an output terminal 4 with the other end. Moreover, between the connection point of the switching device 2 with the choke coil L and the ground, a feedback diode D is connected with the anode thereof on the ground side. In addition, between the connection point of the choke coil L with the output terminal 4 and the ground, a smoothing capacitor C is connected.

In the DC to DC converter section 1, the switching device 2 is subjected to on-off control by a pulse driving signal Vdrv from a control system 10 that will be explained later. When the switching device 2 is in a turned-on state, energy is stored in the choke coil L by a current flowing from the DC power supply 3 to the output terminal 4 and, when the switching device 2 is brought from the turned-on state into a turned-off state, the choke coil L liberates the stored energy to generate electromotive force in the direction of preventing current variation, by which an induced current flows to be obtained as a DC current, which is smoothed by the smoothing capacitor to be outputted at the output terminal 4.

In the control system 10 that controls the driving of the switching device 2 in the DC to DC converter section 1, a terminal voltage of the smoothing capacitor C as an output voltage Vout of the DC to DC converter section 1 is divided by voltage dividing resistors Rd1 and Rd2 to be formed as a feedback voltage Vd, which is inputted to an inverting input terminal of an error amplifier 11. The error amplifier 11 has a reference voltage Vref supplied from a reference voltage source 12 to a non-inverting input terminal. Moreover, the error amplifier 11 outputs an error voltage Vea to which a difference voltage between the feedback voltage Vd and the reference voltage Vref is amplified.

The feedback voltage Vd is also inputted to a non-inverting input terminal of an overvoltage comparator 13. To an inverting input terminal of the overvoltage comparator 13, an overvoltage threshold voltage Vto is inputted which is outputted from an overvoltage threshold voltage control section 14. The overvoltage comparator 13, when the feedback voltage Vd is lower than the overvoltage threshold voltage Vto, outputs a skip signal Vskp at a low level and, when the feedback voltage Vd is equal to or higher than the overvoltage threshold voltage Vto, outputs a skip signal Vskp at the high level.

The overvoltage threshold voltage control section 14 further has the reference voltage Vref inputted which is outputted from the reference voltage source 12.

The overvoltage threshold voltage control section 14 is provided with a first overvoltage threshold voltage output section 15, a second overvoltage threshold voltage output section 16 and a selection switch 17 as a threshold voltage selection section.

The first overvoltage threshold voltage output section 15 is formed with a DC power supply, which adds an additional voltage ΔV1, similar to the additional voltage ΔV in the example of the related control system of a DC to DC converter, to the reference voltage Vref to form a first overvoltage threshold voltage Vto1 as an overvoltage threshold voltage under a normal condition under which the pulse width of a pulse driving signal Vdrv that will be described later is that other than the minimum.

The second overvoltage threshold voltage output section 16 is also formed with a DC power supply, which adds an additional voltage ΔV2 to the reference voltage Vref when the pulse width of the pulse driving signal Vdrv is the minimum to form a second overvoltage threshold voltage Vto2.

The selection switch 17 selects the first overvoltage threshold voltage Vto1 formed by the first overvoltage threshold voltage output section 15 when the level of a selection signal Vsel inputted from a pulse-width detection section 23 that will be explained later is a high level and selects a second overvoltage threshold voltage Vto2 formed by the second overvoltage threshold voltage output section 16 when the level of the selection signal Vsel is a low level. The selected overvoltage threshold voltage is supplied to the inverting input terminal of the overvoltage comparator 13 as an overvoltage threshold voltage Vto.

Moreover, an error voltage Vea outputted from the error amplifier 11 and the skip signal Vskp outputted from the overvoltage comparator 13 are supplied to a pulse-width modulation (PWM) signal generating circuit 18.

Figure 2:
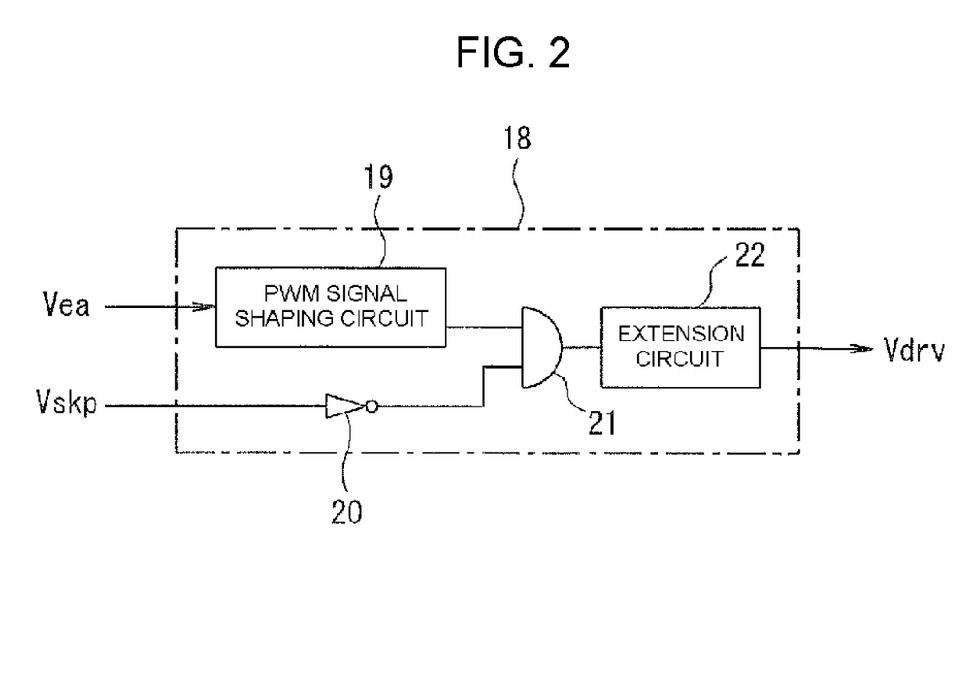
FIG. 2 is a block diagram showing the specific configuration of the PWM signal generating circuit shown in FIG. 1.

The PWM signal generating circuit 18, as is shown in FIG. 2, a block diagram showing the specific configuration thereof, is formed of a pulse-width modulation (PWM) signal shaping circuit 19, an inverter 20, a logical product circuit 21 and an extension circuit 22.

The PWM signal shaping circuit 19 has the error voltage Vea inputted which is outputted from the error amplifier 11 and, on the basis of the error voltage Vea, outputs a PWM base signal corresponding to a portion increasing in proportion to the error voltage Vea of a characteristic curve diagram shown in a block shown in FIG. 1.

The inverter 20 logically inverts the level of the skip signal Vskp outputted from the overvoltage comparator 13.

The logical product circuit 21 has a PWM base signal, outputted from the PWM signal shaping circuit 19, inputted to one input side and a signal, to which the level of the skip signal Vskp is logically inverted by the inverter 20, inputted to the other input side to output a logical product of the inputted signals.

The extension circuit 22 is operated as a driving signal output section to produce a pulse driving signal Vdrv on the basis of the output of the logical product circuit 21 and output the produced signal.

The PWM base signal as the output of the PWM signal shaping circuit 19 is a signal the minimum pulse width of which becomes shorter than the minimum on-time Tmin. Therefore, the extension circuit 22 is a circuit that sets the minimum on-time Tmin on the PWM base signal (makes the minimum pulse width extended up to the Tmin) to provide the PWM base signal as a pulse driving signal Vdrv. An example of the configuration of the extension circuit 22 will be explained later with reference to FIG. 4. The pulse driving signal Vdrv as the output signal of the extension circuit 22 is supplied to the switching device 2 in the DC to DC converter section 1.

Here, when the skip signal Vskp is at the low level, the on-time Ton of the pulse driving signal Vdrv to the error voltage Vea of the error amplifier 11 becomes that as is shown in the characteristic curve diagram illustrated in the block of the PWM signal generating circuit 18. The characteristic curve shown in the characteristic curve diagram is set so that the on-time Ton as a pulse width keeps the minimum on-time Tmin while the error voltage Vea reaches a set voltage Vea1 from zero and, after the error voltage Vea exceeds the set voltage Vea1, increases in direct proportion to an increase in the error voltage Vea. Since the pulse width of the pulse driving signal Vdrv as a pulse-width modulation signal is determined on the basis of the on-time Ton, when the on-time Ton as a pulse width is set at the minimum on-time Tmin, the pulse width of the pulse driving signal Vdrv as a pulse-width modulation signal becomes minimum and after the on-time Ton as a pulse width exceeds the minimum on-time Tmin, the pulse width also increases. When the skip signal Vskp is at the high level, the inverter 20 outputs a low level signal, by which the logical product circuit 21 also outputs a signal at the low level. Thus, the pulse driving signal Vdrv is kept at the low level to leave the switching device 2 turned-off.

The error voltage Vea outputted from the error amplifier 11 is also supplied to the pulse-width detection section 23. The pulse-width detection section 23 is formed with a comparator 24. The comparator 24 has the error voltage Vea, outputted from the error amplifier 11, inputted to the non-inverting input terminal and a lower limit threshold voltage Vlim, set at the set voltage Vea1 in the characteristic curve diagram of the PWM signal shaping circuit 19, inputted to the inverting input terminal. The comparator 24 outputs a high level selection signal Vsel to the selection switch 17 in the overvoltage threshold voltage control section 14 when the error voltage Vea exceeds the lower limit threshold voltage Vlim (=Vea1) and outputs a low level selection signal Vsel to the selection switch 17 in the overvoltage threshold voltage control section 14 when the error voltage Vea is equal to or lower than the lower limit threshold voltage Vlim.

The operation of the first embodiment will now be explained.

When the load connected to the output terminal 4 of the DC to DC converter section 1 is a medium load or a heavy load, the error voltage Vea outputted from the error amplifier 11 normally becomes a voltage higher than the set voltage Vea1 (=Vlim). Thus, the on-time Ton of the pulse driving signal Vdrv outputted from the PWM signal generating circuit 18 becomes larger than the minimum on-time Tmin.

While, the error voltage Vea outputted from the error amplifier 11 is also supplied to the comparator 24 in the pulse-width detection section 23. In the comparator 24, the error voltage Vea exceeding the lower limit threshold voltage Vlim makes the selection signal Vsel at the high level supplied to the selection switch 17 in the overvoltage threshold voltage control section 14. This makes the selection switch 17 select the first overvoltage threshold voltage Vto1 as an overvoltage threshold voltage under a normal condition outputted from the first overvoltage threshold voltage output section 15. The selected first overvoltage threshold voltage Vto1 is supplied to the inverting input terminal of the overvoltage comparator 13 as the overvoltage threshold voltage Vto.

Under this condition, with the feedback voltage Vd being lower than the overvoltage threshold voltage Vto, the skip signal Vskp outputted from the overvoltage comparator 13 is brought to be at the low level. The skip signal Vskp is inverted by the inverter 20 in the PWM signal generating circuit 18 to be at the high level to be supplied to one of the input sides of the logical product circuit 21.

Thus, a PWM base signal with a relatively wide pulse width outputted from the PWM signal shaping circuit 19 is outputted as it is from the PWM signal generating circuit 18 as a pulse driving signal Vdrv, which is supplied to the switching device 2 in the DC to DC converter section 1. Therefore, a pulse signal with a wide on-state pulse width is supplied to the choke coil L to keep the output voltage Vout at the output terminal 4 at the target voltage.

Under such medium to heavy load conditions, when a load is suddenly lightened to cause the output voltage Vout to be brought into an overshot state, the feedback voltage Vd becomes high in response to this to be to come to exceed the first overvoltage threshold voltage Vto1. This makes the skip signal Vskp outputted from the overvoltage comparator 13 at the high level. The skip signal Vskp at the high level is inverted by the inverter 20 in the PWM signal generating circuit 18 to be at the low level and is supplied to the logical product circuit 21. Therefore, in the PWM signal generating circuit 18, the PWM base signal with a wide pulse width outputted from the PWM signal shaping circuit 19 is to be skipped to bring the pulse driving signal Vdrv into an off-state. This brings the switching device 2 in the DC to DC converter section 1 into an off-state, by which the output voltage Vout at the output terminal 4 is reduced to cause the feedback voltage Vd to be slowly reduced.

The reduction in the feedback voltage Vd to the first overvoltage threshold voltage Vto1 or less makes the skip signal Vskp outputted from the overvoltage comparator 13 return to be at the low level, by which the outputting of the pulse driving signal Vdrv from the PWM signal generating circuit 18 starts again.

At the time at which the outputting of the pulse driving signal Vdrv starts again, the occurrence of an overshoot again brings the skip signal Vskp to be at the high level again to stop the outputting of the pulse driving signal Vdrv from the PWM signal generating circuit 18. While such operations are repeated, the error voltage Vea reduces down to a specified voltage to cause no overshooting even though the switching device 2 is made turned-on and -off by the pulse driving signal Vdrv based on the error voltage Vea. Then, the control operation is shifted to the control operation by the error amplifier 11 again.

At this time, since the overvoltage threshold voltage Vto is set at the relatively high first overvoltage threshold voltage Vto1 for a normal operation, the period in which the tuning-on operation of the switching device 2 is skipped increases to accelerate the reduction in the error voltage Vea to enable the stabilization of the output voltage Vout to be quickened.

With the load lightened from such medium to heavy load conditions to a light load condition under which the error voltage Vea outputted from the error amplifier 11 is reduced to be less than the set voltage Vea1, the pulse width of the pulse driving signal Vdrv outputted from the PWM signal generating circuit 18 is set at the minimum on-time Tmin.

With the error voltage Vea brought down to the set voltage Vea1 or less in this way, at the comparator 24 in the pulse-width detection section 23, the error voltage Vea becomes equal to or less than the lower limit threshold voltage Vlim because the lower limit threshold voltage Vlim is set at the set voltage Vea1. This brings the selection signal Vsel outputted from the comparator 24 to be at the low level, by which the selection switch 17 in the overvoltage threshold voltage control section 14 selects a second overvoltage threshold voltage Vto2 outputted from the second overvoltage threshold voltage output section 16 and lower than the previously explained first overvoltage threshold voltage Vto1 for the overvoltage threshold voltage at the time under medium to heavy loads. The selected second overvoltage threshold voltage Vto2 is supplied to the inverting input terminal of the overvoltage comparator 13 as an overvoltage threshold voltage Vto.

When the control system is operated under the light load condition with the pulse width being the minimum value, even though the error voltage Vea outputted from the error amplifier 11 is reduced, the pulse width of the pulse driving signal Vdrv is kept at the minimum on-time Tmin to be brought into no reduction, which makes the output voltage Vout to increase.

However, since the overvoltage threshold voltage Vto, supplied to the inverting input terminal of the overvoltage comparator 13, is set at the second overvoltage threshold voltage Vto2 with the value thereof lower than the value of the first overvoltage threshold voltage Vto1 as an overvoltage threshold voltage for a normal condition. Thus, when the feedback voltage Vd becomes as Vd>Vto2, the skip signal Vskp at the high level is outputted from the overvoltage comparator 13. The skip signal Vskp is inverted by the inverter 20 to be supplied to the logical product circuit 21.

This makes the pulse driving signal Vdrv skipped to bring the switching device 2 in the DC to DC converter section 1 into a turned-off state to reduce the output voltage Vout. Thereafter, with the feedback voltage Vd exceeding the second overvoltage threshold voltage Vto2 (Vd becomes as Vd<Vto2), the outputting of the pulse driving signal Vdrv is started again. Since the second overvoltage threshold voltage Vto2 is set at a lower value compared with the first overvoltage threshold voltage Vto1 under the normal condition, by repeating the above operations, the range of variation in the output voltage Vout can be reduced to be brought close to a target voltage.

Therefore, at the time under medium to heavy loads, by providing the overvoltage threshold voltage Vto as the first overvoltage threshold voltage Vto1 with a large value for a normal condition, the control system is operated as an ordinary overvoltage protection circuit to quickly carry out a shift to an overvoltage protection operation and a return to normal control operation and, along with this, at the time under a light load, by carrying out on-off control capable of actualizing an operation with a minimized error to stabilize the output voltage for enabling an improvement in control accuracy.

Figure 3:
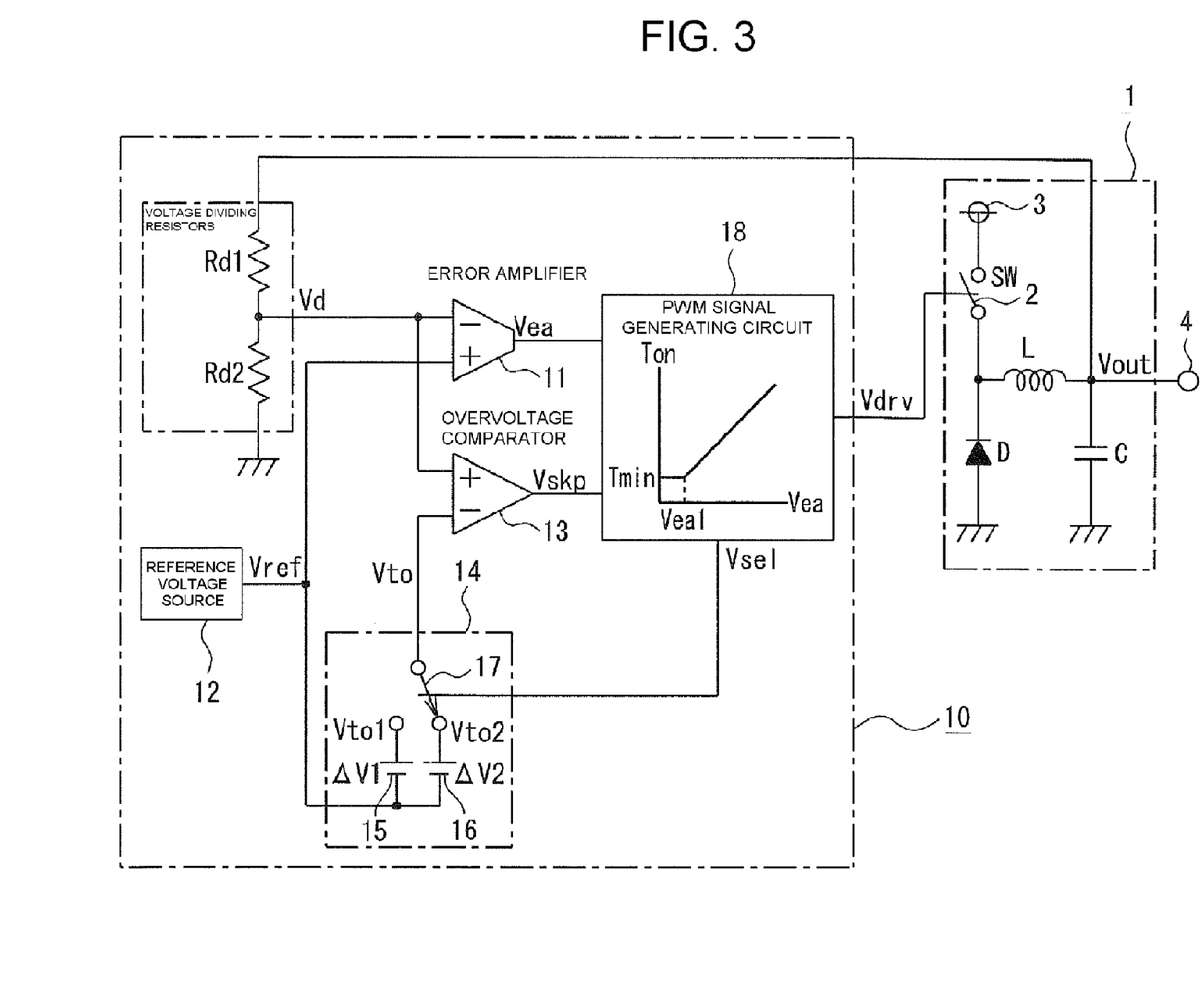
FIG. 3 is a block diagram showing a control system of a DC to DC converter according to a second embodiment of the invention.

In the next, a second embodiment will be explained with reference to FIG. 3 to FIG. 5. FIG. 3 is a block diagram showing a control system of a DC to DC converter according to the second embodiment of the invention. In addition, FIG. 4 is a block diagram showing the specific configuration of the PWM signal generating circuit shown in FIG. 3 and FIG. 5 is a signal waveform diagram (timing chart) illustrating the operation of the PWM signal generating circuit shown in FIG. 4.

In the second embodiment, the circuit configuration is provided so that the reduction in the pulse width of the PWM base signal, outputted from the PWM signal shaping circuit 19, to a value shorter than the minimum on-time Tmin is to be detected on the side of the PWM signal generating circuit 18. In addition, an example of the configuration of the extension circuit is also shown in the block diagram in FIG. 4.

Namely, in FIG. 3 showing the control system of a DC to DC converter according to the second embodiment, the pulse-width detection section 23 in the previously explained first embodiment is omitted. Instead of this, a pulse-width detection section 36 that will be explained later is provided in the PWM signal generating circuit 18, from which the selection signal Vsel is outputted to the overvoltage threshold voltage control section 14. Except for this, the second embodiment has the same configuration as that in the first embodiment. Thus, constituents corresponding to those in the first embodiment shown in FIG. 1 will be denoted by the same reference numerals and signs with the detailed explanations thereof omitted.

Figure 4:
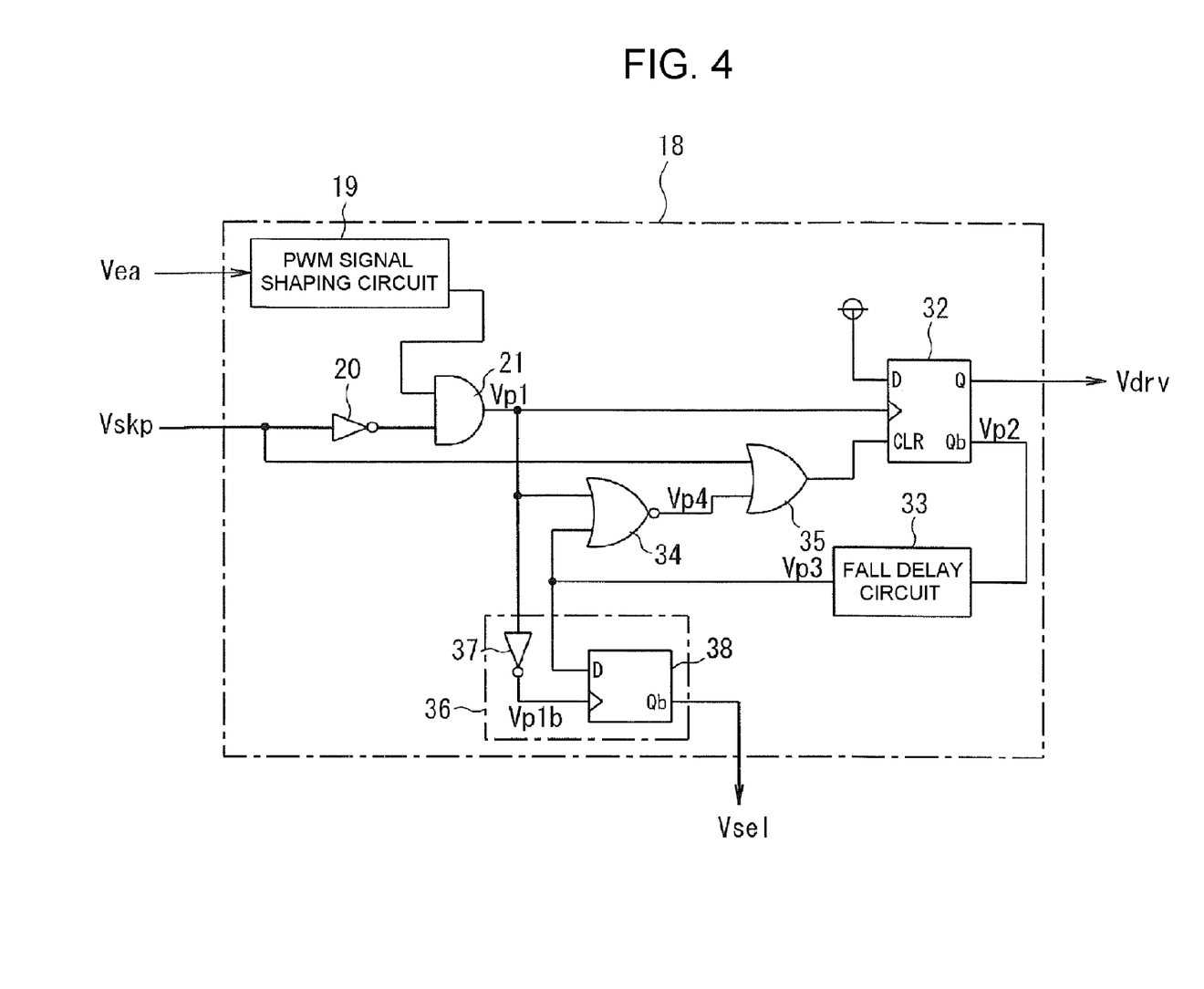
FIG. 4 is a block diagram showing the specific configuration of the PWM signal generating circuit shown in FIG. 3.
Figure 5:
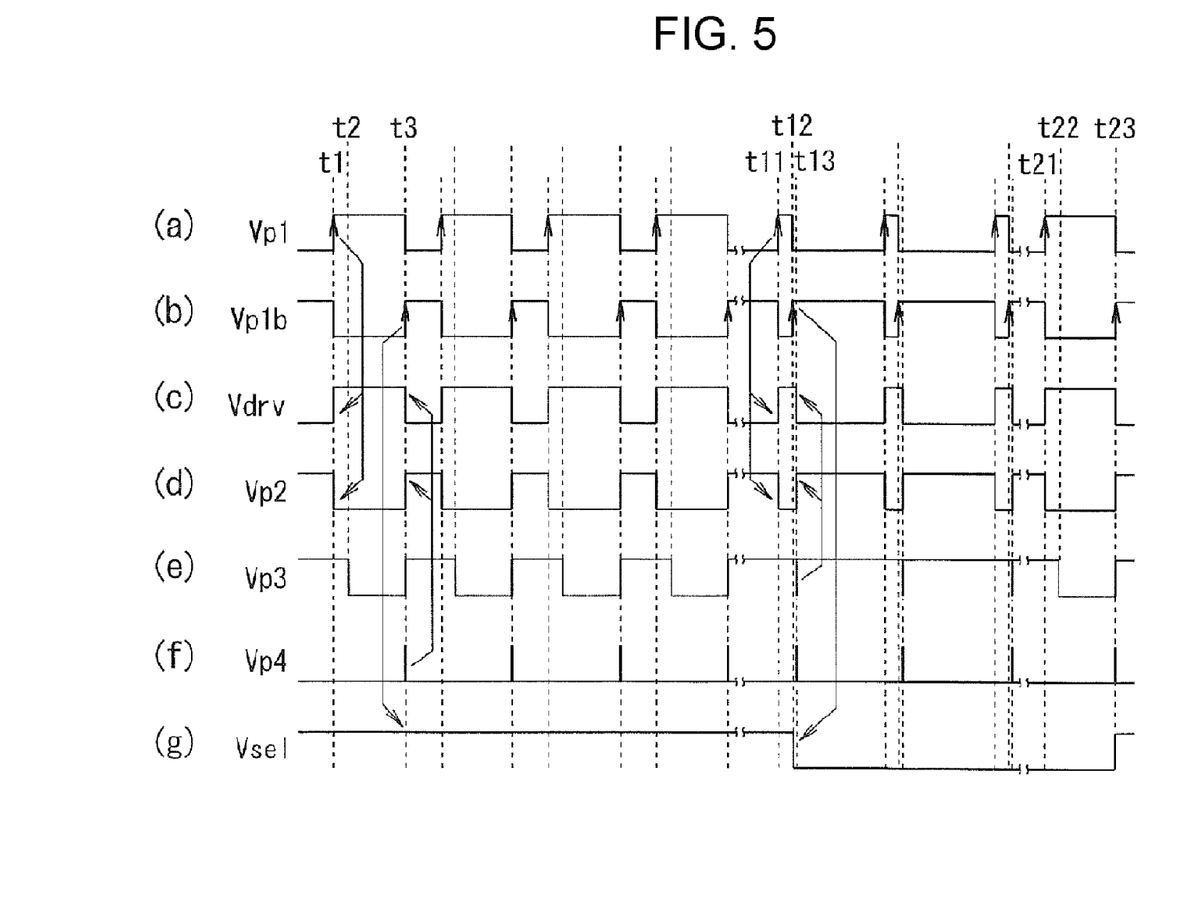
FIG. 5 is a signal waveform diagram illustrating the operation of the PWM signal generating circuit shown in FIG. 4.

Here, the PWM signal generating circuit 18, as is shown in FIG. 4, has a PWM signal shaping circuit 19, an inverter 20 and a logical product circuit 21 like the PWM signal generating circuit 18 in the previously explained first embodiment. Along with this, an output signal Vp1 of the logical product circuit 21 is supplied to the clock input terminal of a D-type flip-flop circuit 32. The D-type flip-flop circuit 32 has a DC voltage of a DC power supply at a specified voltage inputted to a data input terminal D, a pulse driving signal Vdrv outputted from an output terminal Q, and an inverted pulse driving signal Vp2 outputted from an inverted output terminal Qb to a fall delay circuit 33.

In the fall delay circuit 33, the fall of the inverted pulse driving signal Vp2 is made delayed by the minimum on-time Tmin in the previously explained first embodiment. Conversely, the PWM signal generating circuit 18 has a circuit configuration in which the delay time of the fall delay circuit 33 becomes the minimum on-time Tmin.

A delayed signal Vp3 outputted from the fall delay circuit 33 is lead to a NOR circuit 34 as a NOR gate, having the output signal Vp1 of the logical product circuit 21 inputted to one of input terminals, and is supplied to the other one of the input terminals. From the NOR circuit 34, an output signal Vp4 thereof is supplied to one of the input terminals of an OR circuit 35 having the skip signal Vskp inputted to the other one of the input terminals. An output of the OR circuit 35 is supplied as a clear signal to a clear terminal CLR of the D-type flip-flop circuit 32.

With the D-type flip-flop circuit 32, the fall delay circuit 33 and the NOR circuit 34 made served as main components, a driving signal outputting section is formed.

In addition, the delayed signal Vp3 outputted from the fall delay circuit 33 and the output signal Vp1 of the logical product circuit 21 are inputted to a pulse-width detection section 36.

The pulse-width detection section 36 has an inverter 37 and a D-type flip-flop circuit 38. The inverter 37 makes the output signal Vp1 of the logical product circuit 21 inverted to be an inverted signal Vp1b to supply the inverted signal Vp1b to the D-type flip-flop circuit 38. The D-type flip-flop circuit 38 has the delayed signal Vp3, outputted from the fall delay circuit 33, inputted to the data input terminal D and has the inverted signal Vp1b inputted to the clock terminal. From the inverted output terminal Qb of the D-type flip-flop circuit 38, the selection signal Vsel is outputted to the selection switch 17 in the previously explained overvoltage threshold voltage control section 14.

Subsequent to this, the operation of the second embodiment will be explained.

When a load connected to the output terminal 4 of the DC to DC converter section 1 is under medium to heavy load conditions, an error voltage Vea, outputted from the error amplifier 11 in correspondence to the load conditions, becomes a voltage higher than the set voltage Vea1. This increases an on-time Ton to become relatively long to extend the pulse width in an on-state of a PWM base signal outputted from the PWM signal shaping circuit 19 in the PWM signal generating circuit 18 to become relatively wide.

At this time, letting the feedback voltage Vd be lower than the first overvoltage threshold voltage Vto1, the skip signal Vskp outputted from the overvoltage comparator 13 becomes at the low level. Thus, in the PWM signal generating circuit 18, the skip signal Vskp at the low level is inverted by the inverter 20 to be a high level signal, which is supplied to the logical product circuit 21. Hence, from the logical product circuit 21, the above explained PWM base signal with the relatively wide pulse width in an on-state is outputted as it is as an output signal Vp1.

The output signal Vp1 of the logical product circuit 21 comes to have a pulse shape having a pulse width in a turned-on state being relatively wide as shown in (a) in FIG. 5. The output signal Vp1 is inputted to the clock input terminal of the D-type flip-flop circuit 32. Thus, at the time t1 at which the output signal Vp1 rises, the pulse driving signal Vdrv, outputted from the output terminal Q of the D-type flip-flop circuit 32, rises as shown in (c) in FIG. 5 to be at the high level.

In response to this, an inverted pulse driving signal Vp2, outputted from the inverted output terminal Qb of the D-type flip-flop circuit 32, falls at the time t1 as shown in (d) in FIG. 5 to be at the low level. The inverted pulse driving signal Vp2 is supplied to the fall delay circuit 33. Thus, the delayed signal Vp3, outputted from the fall delay circuit 33, as shown in (e) in FIG. 5, falls at the time t2 delayed by the minimum on-time Tmin from the time t1 to be at the low level.

Thereafter, at the time t3, with the output signal Vp1, based on the PWM base signal outputted from the logical product circuit 21, fallen to be at the low level, the inverted signal Vp1b, outputted from the inverter 37 in response to this, rises as shown in (b) in FIG. 5 to be at the high level.

The rising of the inverted signal Vp1b makes the D-type flip-flop circuit 38, using the inverted signal Vp1b as a clock signal, read the delayed signal Vp3 outputted from the fall delay circuit 33. The delayed signal Vp3 is, as shown in (e) in FIG. 5, at the low level at the time t3. Thus, the selection signal Vsel, outputted from the inverted output terminal Qb of the D-type flip-flop circuit 38, is kept to be at the high level being the same as the level before the time t3 as shown in (g) in FIG. 5. The selection signal Vsel is outputted to the selection switch 17 in the overvoltage threshold voltage control section 14.

This makes the selection switch 17 in the overvoltage threshold voltage control section 14 select the first overvoltage threshold voltage Vto1 under a normal condition outputted from the first overvoltage threshold voltage output section 15 to supply the first overvoltage threshold voltage Vto1 to the inverting input side of the overvoltage comparator 13 as an overvoltage threshold voltage Vto.

This allows the output voltage Vout at the output terminal 4 to be kept at the target voltage under the medium to heavy load conditions in the same way as that in the previously explained first embodiment.

While, at the time t3, as shown in (e) in FIG. 5, the delayed signal Vp3 is at the low level and, along with this, as shown in (a) in FIG. 5, the output signal Vp1 of the logical product circuit 21 falls to be at the low level. Thus, as shown in (f) in FIG. 5, the output signal Vp4 outputted from the NOR circuit 34 rises to be at the high level.

The output signal Vp4 at the high level is inputted to the clear terminal CLR through the OR circuit 35. Hence, the pulse driving signal Vdrv outputted from the output terminal Q of the D-type flip-flop circuit 32 is cleared to fall to be at the low level as shown in (c) in FIG. 5. While, the inverted pulse driving signal Vp2 outputted from the inverted output terminal Qb rises to be at the high level as shown in (d) in FIG. 5.

The rising of the delayed signal Vp3 outputted from the fall delay circuit 33 is not made delayed. Thus, the delayed signal Vp3 rises at the same timing as that of the inverted pulse driving signal Vp2 to be at the high level as shown in (e) in FIG. 5. At the NOR circuit 34, the delayed signal Vp3 risen to be at the high level is inputted thereto. Thus, the output signal Vp4 of the NOR circuit 34 returns to be at the low level shortly after being at the high level as shown in (f) in FIG. 5.

After this, with the PWM base signal, outputted from the PWM signal shaping circuit 19 risen to be at the high level again, the operation from the time t1 to the time t3 is repeated to output the selection signal Vsel at the low level. Along with this, the pulse driving signal Vdrv with a pulse width according to the output voltage Vout is outputted to the switching device 2 in the DC to DC converter section 1 to keep the output voltage Vout at the target voltage.

Under the medium to heavy load conditions, a suddenly lightened load increases the output voltage Vout and an accompanied increase in the feedback voltage Vd results in an overvoltage state in which the feedback voltage Vd exceeds the first overvoltage threshold voltage Vto1. Thus, the skip signal Vskp outputted from the overvoltage comparator 13 is brought to be at the high level. This brings the output signal of the inverter 20 in the PWM signal generating circuit 18 to be at the low level, by which the logical product circuit 21 stops the outputting of the PWM base signal shaped in the PWM signal shaping circuit 19. At the same time, when the pulse driving signal Vdrv, outputted from the output terminal Q of the D-type flip-flop circuit 32, is at the high level, the inverted pulse driving signal Vp2 at the low level is outputted from the inverted output terminal Qb. Thus, the delayed signal Vp3 outputted from the fall delay circuit 33, although it is at the high level at the time of rise delay, comes to be at the low level after a specified delay time has elapsed. Therefore, when the delayed signal Vp3 is at the high level, at the time when the delayed signal Vp3 comes to be at the low level, the output signal Vp4 at the high level is outputted from the NOR circuit 34. Moreover, when the delayed signal Vp3 is at the low level, at the time when the output signal Vp1 from the logical product circuit 21 comes to be at the low level, the output signal Vp4 at the high level is outputted from the NOR circuit 34. In any of the cases, the output signal Vp4 at the high level is inputted to the clear terminal CLR of the D-type flip-flop circuit 32. Hence, the D-type flip-flop circuit 32 is cleared to bring the pulse driving signal Vdrv to be at the low level. Therefore, the switching device 2 in the DC to DC converter section 1 comes to be brought into a turned-off state to lower the output voltage Vout.

When the pulse driving signal Vdrv, outputted from the output terminal Q of the D-type flip-flop circuit 32, is at the low level with the skip signal Vskp brought to be at the high level, the inverted pulse driving signal Vp2 outputted from the inverted output terminal Qb is at the high level and the delayed signal Vp3 as the output of the fall delay circuit 33 comes to be at the high level. This makes the output signal Vp4 of the NOR circuit 34 kept to be at the low level, by which the D-type flip-flop circuit 32 is not cleared. However, since the pulse driving signal Vdrv outputted from the D-type flip-flop circuit 32 is kept at the low level, the switching device 2 in the DC to DC converter section 1 continues the turned-off state to lower the output voltage Vout.

The lowered output voltage Vout lowers the feedback voltage Vd down to the first overvoltage threshold voltage Vto1 or less to make the skip signal Vskp, outputted from the overvoltage comparator 13, return to the state at the low level, by which in the PWM signal generating circuit 18, a signal at the high level is supplied from the inverter 20 to the logical product circuit 21. This makes the logical product circuit 21 output therefrom the PWM base signal, which is inputted to the clock terminal of the D-type flip-flop circuit 32 to return the D-type flip-flop circuit 32 to the state in which the pulse driving signal Vdrv is outputted from the output terminal Q.

While, with the load connected to the output terminal 4 brought into a light load condition to make the error voltage Vea outputted from the error amplifier 11 become lower than the set voltage Vea1, the on-time (a time in which a signal is at the high level in one period thereof) of the PWM base signal outputted from the PWM signal shaping circuit 19 in the PWM signal generating circuit 18 becomes shorter than the minimum on-time Tmin.

Under such condition, the rising of the output signal Vp1, outputted from the logical product circuit 21 in the PWM signal generating circuit 18, to a high level from a low level at the time t11 as shown in (a) in FIG. 5 brings the inverted signal Vp1b of the output signal Vp1 to fall from the high level to be at the low level as shown in (b) in FIG. 5.

Then, by the rising of the output signal Vp1 of the logical product circuit 21, the pulse driving signal Vdrv, outputted from the output terminal Q of the D-type flip-flop circuit 32, rises to be at the high level as shown in (c) in FIG. 5, by which the inverted pulse driving signal Vp2 outputted from the inverted output terminal Qb falls from the high level to a low level as shown in (d) in FIG. 5.

Thus, in the fall delay circuit 33, the delayed signal Vp3 falls from the high level to a low level at the time t13 at which the minimum on-time Tmin has passed from the time t11 as shown in (e) in FIG. 5.

However, the on-time (a time in which a signal is at the high level) of the PWM base signal outputted from the PWM signal shaping circuit 19 is shorter than the minimum on-time Tmin. Thus, the output signal Vp1, outputted from the logical product circuit 21, falls from a high level down to a low level at the time t12 before the delayed signal Vp3 falls at the time t13 as shown in (a) in FIG. 5, by which the inverted signal Vp1b, to which the output signal Vp1 is inverted by the inverter 37, rises from the low level to the high level at the time t12 as shown in (b) in FIG. 5.

Hence, the D-type flip-flop circuit 38 in the pulse-width detection section 36, to which circuit the inverted signal Vp1b brought to be at the high level at the time t12 is supplied, is to read and hold the delayed signal Vp3 at the high level at the time t12. This brings the selection signal Vsel, outputted from the inverted output terminal Qb to fall from the high level to be at the low level at the time t12 as shown in (g) in FIG. 5.

Then, the supply of the selection signal Vsel to the selection switch 17 in the overvoltage threshold voltage control section 14 makes the selection switch 17 select a second overvoltage threshold voltage Vto2 lower than the first overvoltage threshold voltage Vto1 under a normal condition. The selected second overvoltage threshold voltage Vto2 is supplied to the inverting input terminal of the overvoltage comparator 13 as an overvoltage threshold voltage Vto.

After this, at the time t13, to which the minimum on-time Tmin as the delay time of the fall delay circuit 33 elapses from the time t11, the delayed signal Vp3 becomes at the low level. At this time, the output signal Vp1 of the logical product circuit 21 is also at the low level. Thus, the output signal Vp4 of the NOR circuit 34, with both of the output signal Vp1 and the delayed signal Vp3 inputted thereto being at the low level, becomes at the high level as shown in (f) in FIG. 5 to make the OR circuit 35 input a signal at the high level to the clear terminal CLR to clear the D-type flip-flop circuit 32. With the D-type flip-flop circuit 32 being cleared, the inverted pulse driving signal Vp2, outputted from the inverted output terminal Qb, and consequently the delayed signal Vp3, outputted from the fall delay circuit 33 receiving the signal Vp2, return to be at the high level, by which the output signal Vp4 of the NOR circuit 34 returns to be at the low level. Therefore, the delayed signal Vp3 at this time becomes a short pulse signal at the low level and the output signal Vp4 becomes a short pulse signal at the high level.

In the case in which the control system is operated under the light load condition by a pulse signal with the minimum pulse width, even though the error voltage Vea outputted from the error amplifier 11 is lowered, the pulse driving signal Vdrv once brought to be at the high level keeps the high level state until the minimum on-time Tmin as a delay time elapses to bring the delayed signal Vp3 from the fall delay circuit 33 to be at the low level. This, under the light load condition, sets (adds) the minimum on-time Tmin to the pulse driving signal Vdrv. Namely, the D-type flip-flop circuit 32, the fall delay circuit 33 and the NOR circuit 34 form the previously explained extension circuit 22. In this way, the pulse width of the pulse driving signal Vdrv is never reduced to the minimum on-time Tmin or less, which is to increase the output voltage Vout.

However, since the overvoltage threshold voltage Vto, supplied to the inverting input terminal of the overvoltage comparator 13, is set at the second overvoltage threshold voltage Vto2, when the feedback voltage Vd comes to be as Vd>Vto2, from the overvoltage comparator 13, the skip signal Vskp is outputted, which is inverted by the inverter 20 to be at the low level and supplied to the logical product circuit 21.

This causes the PWM base signal to be skipped in the logical product circuit 21 and, along with this, brings the pulse driving signal Vdrv, outputted from the output terminal Q of the D-type flip-flop circuit 32, to be at the low level or to keep the low level. Thus, the switching device 2 in the DC to DC converter section 1 is brought into a turned-off state to lower the output voltage Vout. After this, the feedback voltage Vd exceeding the second overvoltage threshold voltage Vto2 starts the outputting of the pulse driving signal Vdrv again. By repeating the operation, the output voltage Vout can be kept at the low voltage. At this time, the second overvoltage threshold voltage Vto2 is set at so small value compared with the first overvoltage threshold voltage Vto1 at the normal operation that the range of variations in the output voltage Vout can be made small to bring the output voltage Vout close to the target voltage.

Thereafter, when the condition returns to the medium to heavy load conditions at the time t21, the same operations as those from the time t1 to the time t3 are carried out to return the selection signal Vsel to the state at the high level. This makes the selection switch 17 in the overvoltage threshold voltage control section 14 select the first overvoltage threshold voltage Vto1 under the normal condition, which voltage is supplied to the inverting input terminal of the overvoltage comparator 13.

Therefore, at the time under the medium to heavy load conditions, by providing the overvoltage threshold voltage Vto as the first overvoltage threshold voltage Vto1 with a high voltage for the normal condition, a normal overvoltage protection operation is carried out and, after the overvoltage protection operation, the operation is made to quickly return to the normal control operation carried out by the error amplifier 11. Moreover, at the time under the light load condition, the output voltage control is carried out with a small error to stabilize the output voltage. By the control operations carried out in this way, control accuracies can be made improved.

In the first and second embodiments, the case was explained in which the first overvoltage threshold voltage Vto1 and the second overvoltage threshold voltage Vto2 are provided by adding the additional voltages $\Delta V1$ and $\Delta V2$, respectively, to the reference voltage Vref. The invention, however, is not limited to this, but the first overvoltage threshold voltage Vto1 and the second overvoltage threshold voltage Vto2 can be provided by preparing their respective individual DC voltage power supplies with the first overvoltage threshold voltage Vto1 and the second overvoltage threshold voltage Vto2 being disconnected from the reference voltage source 12. Furthermore, the additional voltages $\Delta V1$ and $\Delta V2$ can be actualized by making the overvoltage comparator 13 have an input offset voltage including the additional voltage.

In addition, in each of the first and second embodiments, the explanation was made with respect to the case in which the invention is applied to a chopper type DC to DC converter. The invention, however, is not limited to the cases but can be also applied to a boost-type DC to DC converter, in which a choke coil L is directly connected to the positive side of a DC power supply with one end and is connected to an output terminal with the other end through a diode D, and the connection point between the choke coil L and the diode D is connected to the negative side of the DC power supply through a switching device, or can be applied to a DC to DC converter with another circuit configuration.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A control system for a DC to DC converter having a switching device, comprising:
    an error amplifier which amplifies a difference voltage between a feedback voltage of an output of the DC to DC converter and a reference voltage and outputs an error voltage;
    an overvoltage comparator which outputs a skip signal when the feedback voltage exceeds an overvoltage threshold voltage that is set higher than the reference voltage;
    a pulse-width modulation signal generating circuit that is connected to an output terminal of the error amplifier and an output terminal of the overvoltage comparator and that generates a pulse driving signal as a pulse signal that drives the switching device of the DC to DC converter, the pulse driving signal having a pulse width that varies as a function of the error voltage of the error amplifier so that the width is equal to a set minimum value or more, the pulse driving signal being interrupted if the overvoltage comparator outputs the skip signal;
    a pulse-width detection section which detects whether the pulse width of the pulse driving signal has the minimum value or not and outputs a selection signal; and
    an overvoltage threshold voltage control section which lowers the overvoltage threshold voltage when the selection signal indicates that the pulse width of the pulse driving signal has the minimum value.

2. The control system of the DC to DC converter as claimed in claim 1, wherein the pulse-width modulation signal generating circuit comprises:
    a pulse-width modulation signal shaping circuit which converts the error voltage of the error amplifier to a pulse-width modulation base signal;

a logical product circuit which outputs a logical product signal of the pulse-width modulation base signal and the skip signal; and a driving signal output section which outputs the pulse driving signal on the basis of the logical product signal of the logical product circuit.

3. A control system for a DC to DC converter having a switching device, comprising:

an error amplifier which amplifies a difference voltage between a feedback voltage of an output of the DC to DC converter and a reference voltage and outputs an error voltage;

an overvoltage comparator which outputs a skip signal when the feedback voltage exceeds an overvoltage threshold voltage that is set higher than the reference voltage;

a pulse-width modulation signal generating circuit that is connected to the error amplifier and the overvoltage comparator and that generates a pulse driving signal as a pulse signal that drives the switching device of the DC to DC converter, the pulse driving signal having a pulse width that varies as a function of the error voltage of the error amplifier so that the width is equal to a set minimum value or more, the pulse driving signal being interrupted if the overvoltage comparator outputs the skip signal;

a pulse-width detection section which detects whether the pulse width of the pulse driving signal has the minimum value or not and outputs a selection signal; and an overvoltage threshold voltage control section which lowers the overvoltage threshold voltage when the selection signal indicates that the pulse width of the pulse driving signal has the minimum value, wherein the overvoltage threshold voltage control section comprises:

a first overvoltage threshold voltage output section which outputs a first overvoltage threshold voltage selected for the pulse width of the pulse driving signal being a width other than the minimum value;

a second overvoltage threshold voltage output section which outputs a second overvoltage threshold voltage that is lower than the first overvoltage threshold voltage; and a threshold voltage selecting section which selects one of the output of the first overvoltage threshold voltage output section and the output of the second overvoltage threshold voltage output section on the basis of the selection signal outputted from the pulse-width detection section.

4. A control system for a DC to DC converter having a switching device, comprising:

an error amplifier which amplifies a difference voltage between a feedback voltage of an output of the DC to DC converter and a reference voltage and outputs an error voltage;

an overvoltage comparator which outputs a skip signal when the feedback voltage exceeds an overvoltage threshold voltage that is set higher than the reference voltage;

a pulse-width modulation signal generating circuit that is connected to the error amplifier and the overvoltage comparator and that generates a pulse driving signal as a pulse signal that drives the switching device of the DC to DC converter, the pulse driving signal having a pulse width that varies as a function of the error voltage of the error amplifier so that the width is equal to a set minimum value or more, the pulse driving signal being interrupted if the overvoltage comparator outputs the skip signal;

a pulse-width detection section which detects whether the pulse width of the pulse driving signal has the minimum value or not and outputs a selection signal; and an overvoltage threshold voltage control section which lowers the overvoltage threshold voltage when the selection signal indicates that the pulse width of the pulse driving signal has the minimum value, wherein the pulse-width detection section detects whether or not the error voltage is equal to or less than a voltage that makes the pulse width of the pulse driving signal the minimum, and outputs the selection signal at a level corresponding to the result of the detection.

5. A control system for a DC to DC converter having a switching device, comprising:

an error amplifier which amplifies a difference voltage between a feedback voltage of an output of the DC to DC converter and a reference voltage and outputs an error voltage;

an overvoltage comparator which outputs a skip signal when the feedback voltage exceeds an overvoltage threshold voltage that is set higher than the reference voltage;

a pulse-width modulation signal generating circuit that is connected to the error amplifier and the overvoltage comparator and that generates a pulse driving signal as a pulse signal that drives the switching device of the DC to DC converter, the pulse driving signal having a pulse width that varies as a function of the error voltage of the error amplifier so that the width is equal to a set minimum value or more, the pulse driving signal being interrupted if the overvoltage comparator outputs the skip signal;

a pulse-width detection section which detects whether the pulse width of the pulse driving signal has the minimum value or not and outputs a selection signal; and an overvoltage threshold voltage control section which lowers the overvoltage threshold voltage when the selection signal indicates that the pulse width of the pulse driving signal has the minimum value, wherein the pulse-width modulation signal generating circuit comprises: a pulse-width modulation signal shaping circuit which converts the error voltage of the error amplifier to a pulse-width modulation base signal;

a logical product circuit which outputs a logical product signal of the pulse-width modulation base signal and the skip signal; and a driving signal output section which outputs the pulse driving signal on the basis of the logical product signal of the logical product circuit, and wherein the driving signal outputting section comprises:

a D-type flip-flop circuit having a clock input terminal that receives the logical product signal of the logical product circuit, having a data input terminal that receives a positive DC power supply voltage, an output terminal that outputs the pulse driving signal, an inverted output terminal that outputs an inverted pulse driving signal, and a clear terminal;

a fall delay circuit that receives the inverted pulse driving signal and outputs a delayed inverted pulse driving signal; and a NOR gate having an input terminal that is connected to an output terminal of the logical product circuit and another input terminal that is connected to an output terminal of the fall delay circuit, the NOR gate additionally having an output terminal that is connected to the clear terminal of the D-type flip-flop circuit.

6. The control system of the DC to DC converter as claimed in claim 5, wherein the pulse-width detection section further comprises an inverter; and another D-type flip-flop circuit having an input terminal that receives the delayed inverted pulse driving signal, a clock terminal that is connected to the output terminal of the logical product circuit by way of the inverter, and an inverted output terminal that outputs the selection signal.

* * * * *